United States Patent [19]
Brock et al.

[11] Patent Number: 4,936,407
[45] Date of Patent: Jun. 26, 1990

[54] SAFETY RAIL FOR VEHICLE CATWALKS

[75] Inventors: Joseph Brock, Dublin; John Naughton, Limerick; Gerard Hayes, Limerick; John Keane, Limerick, all of Ireland

[73] Assignee: Safewalk Railings Limited, Limerick, Ireland

[21] Appl. No.: 177,928

[22] Filed: Apr. 5, 1988

[30] Foreign Application Priority Data

| Apr. 6, 1987 [IE] | Ireland | 380/87 |
| Dec. 17, 1987 [IE] | Ireland | 3422/87 |
| Feb. 25, 1988 [IE] | Ireland | 511/88 |

[51] Int. Cl.⁵ .......................... B60P 3/22; B60T 7/12
[52] U.S. Cl. .................................. 180/271; 182/113; 280/830
[58] Field of Search ............. 280/5 R, 5 C, 5 D, 830, 280/837, 838; 105/358, 461, 457, 463.1; 180/271; 182/112, 113

[56] References Cited

U.S. PATENT DOCUMENTS

| 1,953,390 | 4/1934 | Bosch | 182/112 |
| 2,946,485 | 7/1960 | Durner | 180/271 |
| 4,371,056 | 2/1983 | Anglade | 182/113 |
| 4,613,155 | 9/1986 | Greenwood | 105/457 |

FOREIGN PATENT DOCUMENTS

| 2353416 | 12/1977 | France | 280/5 R |
| 66035 | 4/1982 | Japan | 280/5 R |
| 926289 | 5/1963 | United Kingdom . | |
| 2084085 | 4/1982 | United Kingdom . | |

Primary Examiner—Charles A. Marmor
Assistant Examiner—Karin Tyson
Attorney, Agent, or Firm—Fleit, Jacobson, Cohn, Price, Holman & Stern

[57] ABSTRACT

A safety rail assembly for a vehicle catwalk comprises a rail pivotally connected to the vehicle. The rail is movable by rams from a storage position lying across the catwalk to a raised operative position. The rams are connected to the vehicle pneumatic brake system so that the vehicle brakes are continuously in operation while the rail is raised.

21 Claims, 5 Drawing Sheets

SAFETY RAIL FOR VEHICLE CATWALKS

The invention relates to a safety rail assembly for a vehicle catwalk. The term "catwalk" as used in this specification refers to the footway along the top of a vehicle body such as, for example, the footway along the top of a tanker body giving access to openings into each of a number of tank sections.

In a vehicle such as a tanker the tanker body is usually divided into a number of tank sections each carrying a quantity of liquid therein. To check the contents of each tank section a calibrated dip stick is inserted into the tank through an access opening on the top of the tank. It is also necessary to enter the tank sections through these access openings from time to time to carry out maintenance checks on each tank section. A catwalk is usually provided along the top of a tank adjacent the access openings to provide a platform from which each tank section can be dipped. As can be appreciated, when using the catwalk it is relatively easy to lose one s footing, especially in cases where some of the liquid cargo or rainwater has fallen on the catwalk and/or where the catwalk is used in windy conditions or, indeed, if the vehicle is started up. Indeed there have been a number of accidents where persons have fallen from the catwalk of a vehicle and sustained serious bodily injury.

There is therefore a need for a safety rail to help prevent accidents when using a vehicle catwalk.

The present invention is directed towards providing such a safety rail.

According to the invention there is provided a safety rail assembly for a vehicle catwalk comprising a rail and actuating means to move the rail from a stored position to a raised operative position.

Ideally, the rail is pivotally mounted for movement about a pivot axis between the stored and operative positions.

Preferably, the pivot axis extends substantially parallel to the longitudinal axis of a vehicle catwalk.

In one embodiment, in the stored position the rail overlies at least portion of the catwalk.

In another embodiment, the rail includes an accessory blocking portion which, in the stored position projects beyond the catwalk adjacent an access way to the catwalk to prevent access to the catwalk unless the rail is in the operative position.

In a further embodiment, the assembly includes a locking means to rigidly secure the rail in the stored and/or operative position.

In one aspect of the invention, the rail includes an access opening blocking portion which, in the stored position lies across access openings to the vehicle body when the rail is in the stored position preventing use of the access openings unless the rail is in the raised operative position.

In a preferred embodiment, the actuating means comprises a ram means.

Preferably the ram is in the extended position when the rail is in the stored position. This is to ensure that the rail is retained in the stored position when the vehicle is in motion.

In this latter embodiment, the ram means is preferably pneumatically operated from the pneumatic system of a vehicle.

Preferably, the ram means comprises at least one ram extending between the rail and the vehicle. In one aspect, the ram means comprises a plurality of spaced-apart rams. Ideally, the or each ram is located adjacent the pivot axis of the rail.

In another aspect, restricted exhaust valves are provided for the ram means to prevent the rail from lowering dangerously quickly.

In an alternative embodiment of the invention, the ram means is hydraulically operated.

Preferably, the assembly includes operating means located remote from the rail for operating the actuating means.

Preferably, the assembly includes remote indication means to indicate the position of the rail.

In one aspect of the invention, the assembly includes cut-out means to prevent the vehicle from moving if the rail is in the raised operative position.

In this latter embodiment, the cut-out means preferably operates to engage the vehicle brakes when the rail is raised to prevent operation of the vehicle brake control system while the rail is raised.

Preferably, the cut-out means comprises a brake valve operated by the actuating fluid of the actuating means to operate the vehicle brakes when the ram means are actuated.

Ideally, the brake valve is interposed between the vehicle brake control system and the vehicle brakes to prevent access of the brake control system to the brakes when the ram means are activated.

In these latter two embodiments, the actuating fluid is preferably air from the vehicle pneumatic system.

In one embodiment, the brake valve is a shuttle valve.

Alternatively, the cut-out means operates to urge the rail into the stored position when the vehicle brakes are disengaged.

In this latter alternative embodiment, the actuating means are disconnected from the actuating fluid when the vehicle brakes are disengaged.

The invention will be more clearly understood from the following description of some preferred embodiments thereof given by way of example only with reference to the accompanying drawings in which.

Figures 1, 1A:
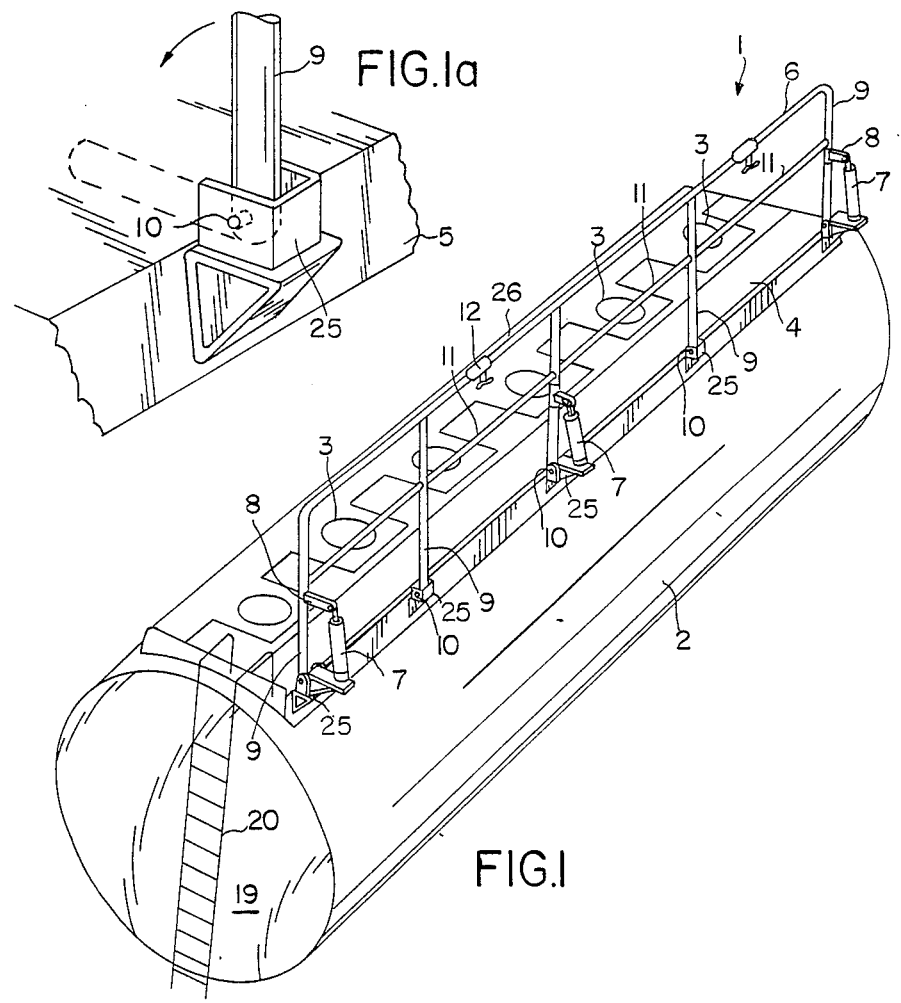
FIG. 1 is a perspective view of a safety rail assembly.
Figure 2:
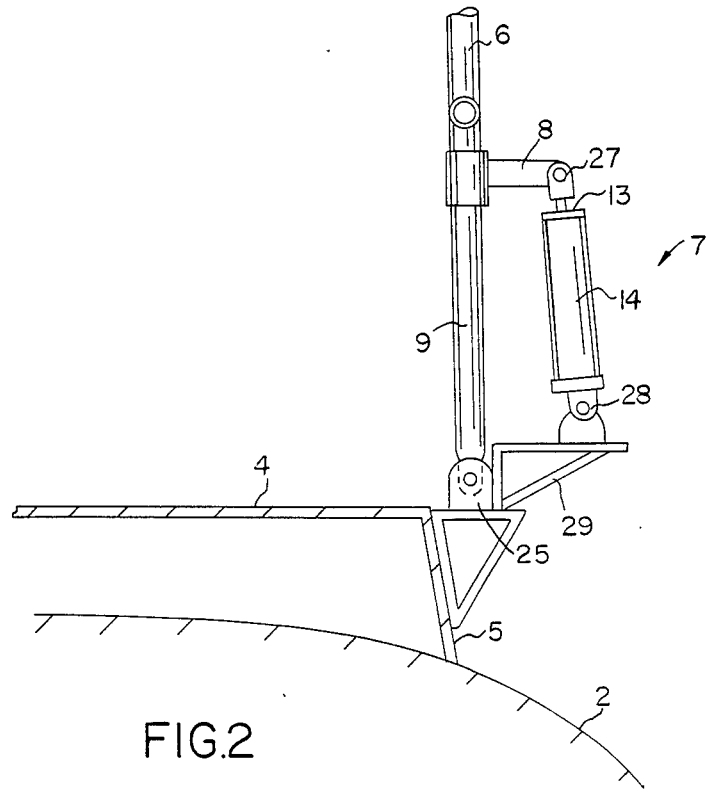
FIG. 2 is a sectional view of a portion of the safety rail assembly of FIG. 1.
Figure 3:
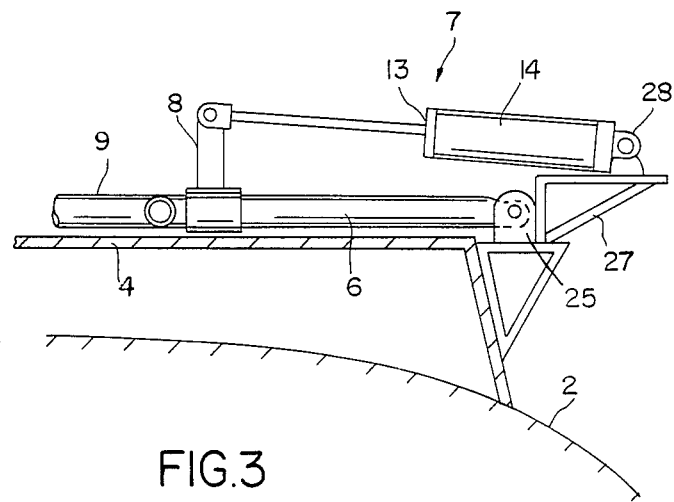
FIG. 3 is a sectional view of the same portion of the safety rail assembly of FIG. 1 in another position.

Referring to the drawings and initially to FIGS. 1 to 3, there is illustrated a safety rail assembly for a vehicle catwalk indicated generally by the reference numeral 1. The rail assembly 1 is shown mounted on a tank 2 forming part of a tanker. The tank 2 is of conventional construction being internally divided into a number of separate compartments each having an entrance thereto by means of a removable cover 3 located at the top of the tank 2. Access to the covers 3 is provided by a catwalk 4 supported on a frame 5 and mounted along the top of the tank 2. A ladder 20 is mounted at one end 19 of the tank 2 for access to the catwalk 4.

The safety rail assembly 1 comprises a tubular rail 6 pivotally mounted to the frame 5 for pivotal movement about a pivot axis and actuating means to pivot the rail 6 from a stored position in which it lies across the catwalk 4, see FIG. 3, to an upright operative position as shown in FIGS. 1 and 2.

The rail in this case comprises five spaced-apart stanchions 9 which are pivotally connected at the lower ends thereof by a pivot pin 10 to brackets 25 welded to the frame 5, the pivot axes defined by the pins 10 being co-linear and extending substantially parallel to the longitudinal axis of the tank 2. It will be noted that the rail 6 is mounted at one side of the catwalk 4 and extends the full length of the catwalk. An upper longitudinal rail member 26 and connecting rail members 11 extend between the stanchions. Buffer means to buffer the movement of the rail 6 over the catwalk 4 is provided by three anti-vibration buffer pads 12 which in this case are mounted to the upper longitudinal rail member 26. The buffer pads 12 are pivotally mounted to the rail member 26 so that they hang down unobtrusively when the rail 6 is in the raised operative position illustrated in FIG. 1. As the rail 6 moves towards the stored position the pads 12 are interposed between the rail 6 and the catwalk 4.

The actuating means for moving the rail 6 between the stored and operative positions in this case comprises five pneumatic ram means 7, one associated with each stanchion 9. Referring particularly to FIGS. 2 and 3 each ram means 7 comprises a ram 13 and associated cylinder 14 having a through hole 16 to the inside of the cylinder to which an air supply, usually from the pneumatic system of a vehicle, is connected. The ram 13 is pivotally connected at 27 to a bracket 8 mounted on the stanchion 9 and the cylinder 14 is pivotally connected at 28 to a bracket 29 which in this case is welded to the tank 2.

Figure 4:
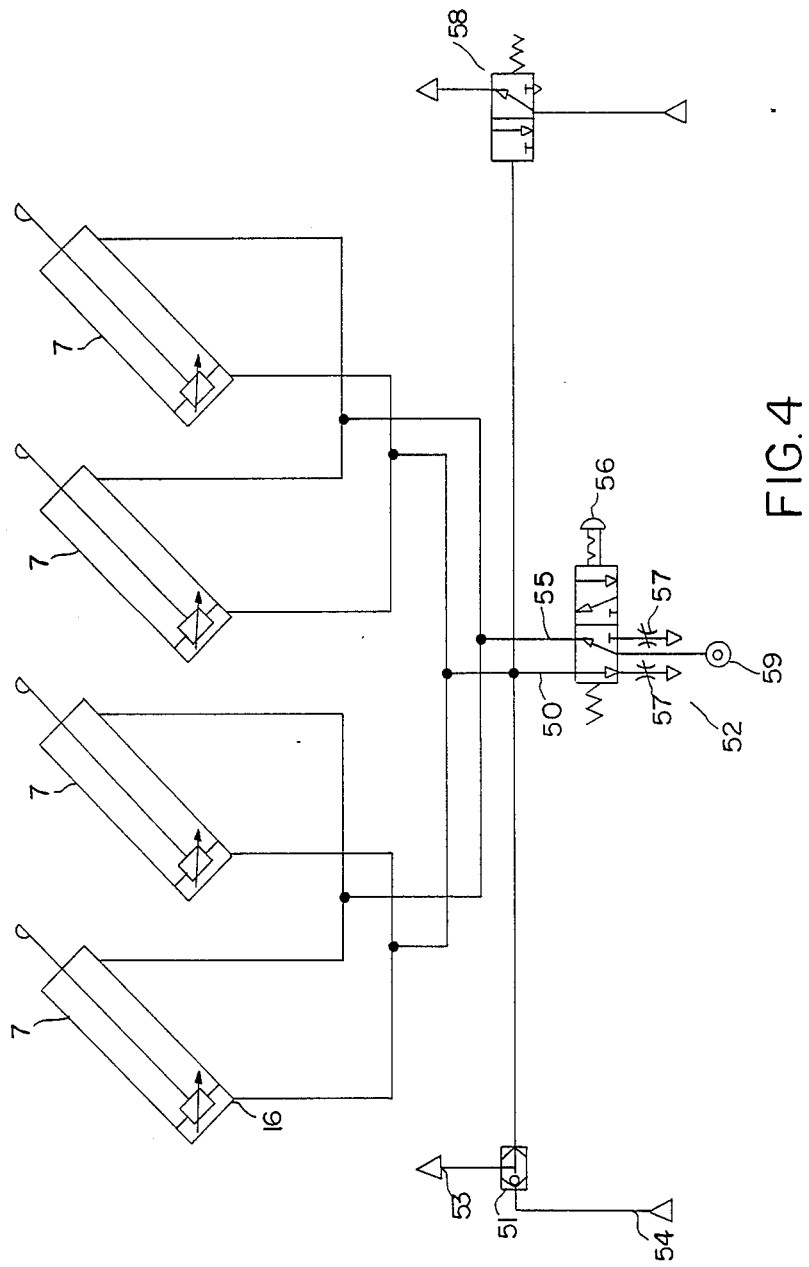
FIG. 4 is a schematic diagram of the air supply system for the pneumatic ram means of the safety rail assembly of FIG. 1.

Referring now to FIG. 4 the connection of four of the ram means 7 to the vehicle pneumatic system is illustrated in more detail. The lower through holes 16 of each of the ram means 7 are connected by actuating air lines 50 to a rail control valve 52 which is, in turn, connected to the vehicle pneumatic system by a air line 59. The ram means 7 are connected at their upper ends to the rail control valve 52 by de-actuating air lines 55. The rail control valve 52 includes a user-adjustable knob 56 which is suitable for mounting inside a vehicle cab, and a pair of restricted exhaust valves 57. One of the actuating air lines 50 is also connected to a safety pressure regulator valve 58. In this case, the user-adjustable knob 56 is mounted in the vehicle cab.

Cut-out means are provided in this case by a brake shuttle valve 51 interposed between the vehicle's brake control system 54 and the actuating air lines 50 on one side and the vehicle brakes 53 on the other side.

In use, the rail 6 is normally maintained in the stored position as shown in FIG. 3. The rail 6 is stored against the vehicle to reduce windage when in transit and to keep the height of the vehicle to a minimum. The rail 6 is retained locked in the lowered position by the rams 7 which are extended when the rail is in the lowered position. When it is necessary to use the catwalk 4, the user operates the knob 56 of the rail control valve 52 to pressurise the actuating air lines 50 and thereby actuate the ram means 7 and to raise the safety rail 6. In addition to actuating the ram means 7, the air pressure in the actuating air lines 50 also switches over the brake shuttle valve 51 and activates the vehicle brakes 53. In this position, the brake shuttle valve 51 effectively disables the vehicle brake control pneumatic system 54. In this case therefore, the vehicle brakes are immediately applied when the safety rail 6 is raised and the brakes can not be disengaged as long as the rail 6 is raised. The user then climbs onto the catwalk 4 and uses the rail 6 as a support. After descending from the catwalk 4, the user again operates the knob 56 to change-over the rail control valve 52 to cause the de-actuating air lines 55 to be pressurised. Exhaust air is transmitted by the actuating air lines 50 to the restricted exhaust valves 57. The brake shuttle valve 51 then switches to allow operation of the brake control system. As the exhaust valves 57 are restricted, the safety rail 6 does not lower dangerously quickly.

In this case the movement of the rail between the operative upright and stored collapsed positions is buffered by maintaining pressure in the cylinders of the rams. This prevents the rail from moving dangerously quickly. In addition, it ensures that the rail resists wind forces when the tanker is in motion which might tend to lift it. The configuration of the rams so that they are extended when the rail is in the collapsed position is important in this respect in ensuring that the rail is effectively locked in the stored position.

It will be appreciated that while it is preferable to use the operating fluid to buffer the operations of the rail alternatively or additionally anti-vibration buffer pads may be freely pivotally mounted to the rail so that they hang downwards unobtrusively when the rail is in the raised position and are interposed between the rail and the catwalk when the rail is moved to the lowered position.

While the rams and the pivot arrangement generally may be provided at any suitable location it is preferred that the rams be arranged on the side of the rail opposite the catwalk. This is a safety precaution to ensure that there are no obstructions to an operator walking along the catwalk.

It will be appreciated that the above described pneumatic system provides for safe use of the catwalk 4 as the vehicle brakes are continuously in operation as long as the safety rail is raised. Further, as restricted exhaust valves are provided, the rail may not lower dangerously quickly. It will further be appreciated that there is little chance of faults occurring in the brake and safety rail operation due to the pressure regulator safety valve 58.

Figure 6:
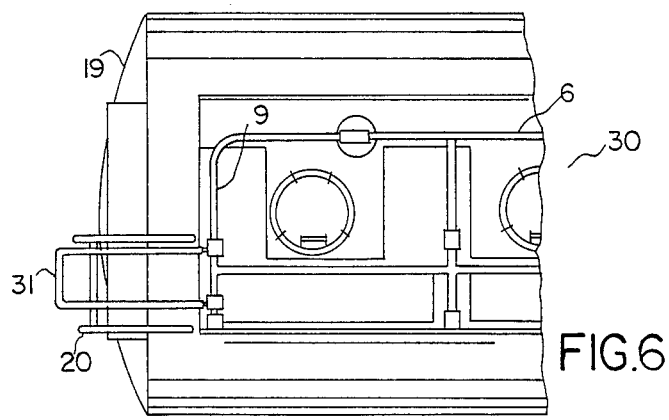
FIG. 6 is a plan view of the safety rail assembly of FIG. 5 with the rail in a stored position.
Figure 5:
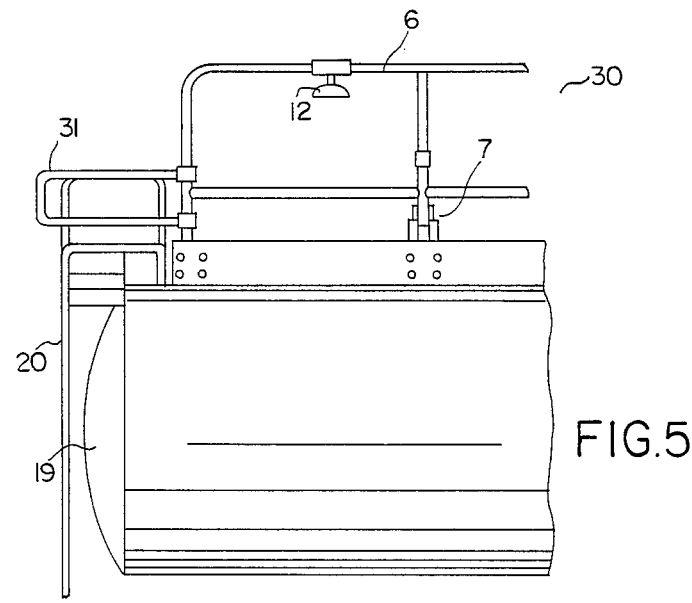
FIG. 5 is an elevational view of portion of another safety rail assembly.

Referring now to FIGS. 5 and 6 there is illustrated another safety rail 30 according to the invention being of largely similar construction to the safety rail assembly 1 and like parts are assigned the same reference numerals. The only difference in construction is that in this case the rail 6 of the safety rail assembly 30 has an extended portion, in this case comprising a U-shaped tubular bracket 31, mounted on an end stanchion 9 of the rail 6 and extending over the end 19 of the tank 2. When the rail 6 is in the stored position as shown in FIG. 6 the bracket 31 projects over the top of the ladder 20 preventing access to the catwalk 4 when the rail 6 is in a stored position. It is necessary to pivot the rail 6 into the upright position to have free access to the catwalk 4.

Figure 7:
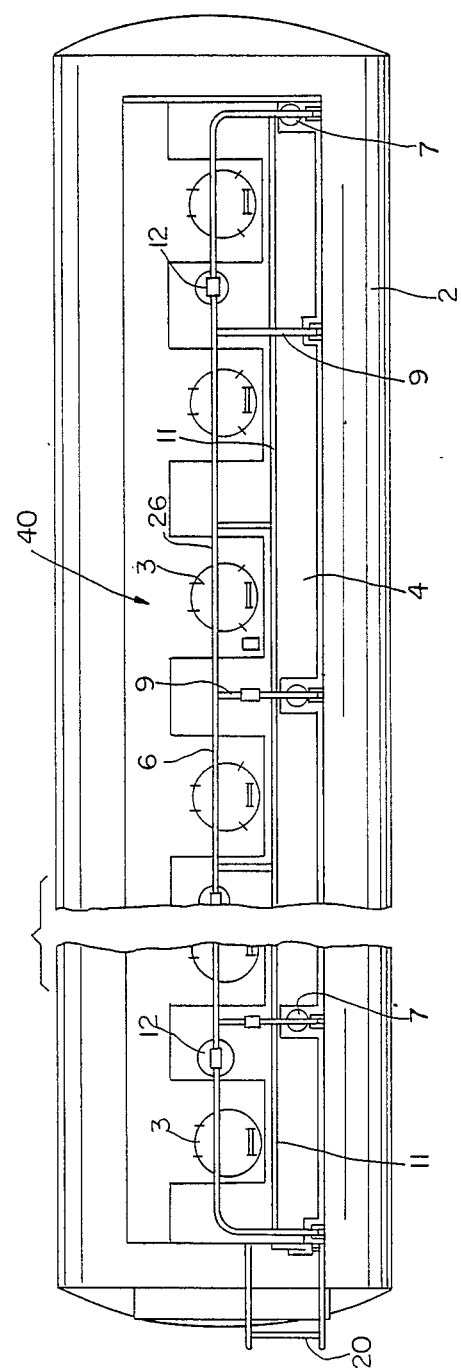
FIG. 7 is a plan view of portion of a further safety rail assembly.

Referring now to FIG. 7 there is illustrated another safety rail assembly 40 according to the invention. Again this is of largely similar construction to the safety rail assembly 1 and like parts are assigned the same reference numerals. In this case the rail 6 is constructed such that the upper longitudinal rail member 26 will lie over the covers 3 leading into the compartments of the tank 2 when the rail 6 is in the stored position as illustrated. This ensures that the rail 6 must be pivoted into the upright position before opening any of the covers 3 for access to the tank compartments thus ensuring that the rail 6 is in the upright position whenever the catwalk 4 is used. Further, the rail 6, when in the stored position prevents unauthorised access to the compartments of the tank 2.

The invention provides a convenient support when using the catwalk, reducing the possibility of accidents occurring when using the vehicle catwalk especially since the safety rail can not be used unless the vehicle is stationary.

It will be appreciated that many different constructions of rail are possible without departing from the scope of the invention. Thus, the rail assembly may have locking means for locking the rail in either one of the stored or raised positions, and there may be remote indication means for indicating the position of the rail.

It will be appreciated that the safety rail assembly may be of any suitable material of construction.

We claim:

1. A safety rail assembly for a vehicle catwalk on a vehicle having vehicle brakes and a brake control system, the assembly comprising:
   a rail;
   fluid operated actuating means for moving the rail from a stored position to a raised operative position; and
   brake engaging means operated by actuating fluid of the actuating means for applying the vehicle brakes and preventing operation of the vehicle brake control system when the rail is raised.

2. A safety rail assembly as recited in claim 1, wherein the brake engaging means comprises a brake valve operated by the actuating fluid of the actuating means for applying the vehicle brakes when the rail is raised.

3. A safety rail assembly as recited in claim 1, wherein the brake valve is interposed between the vehicle brake control system and the vehicle brakes for preventing access of the vehicle brake control system to the vehicle brakes when the rail is raised.

4. A safety rail as recited in claim 1, wherein in the stored position, the rail overlies at least a portion of the catwalk.

5. A safety rail assembly as recited in claim 1, wherein the rail includes an access blocking portion which, in the stored position projects beyond the catwalk adjacent an access way to the catwalk to prevent access to the catwalk unless the rail is in the operative position.

6. A safety rail assembly as recited in claim 1, wherein the rail includes an access opening block portion which lies across access openings to a body of the vehicle when the rail is in the stored position preventing use of the access opening unless the rail is in the raised operative position.

7. A safety rail assembly as recited in claim 1, in which the actuating means comprises a ram means, operated from a fluid pressure system of the vehicle.

8. A safety rail assembly as recited in claim 7, wherein the ram means comprises at least one ram extending between the rail and the vehicle.

9. A safety rail assembly as recited in claim 8, wherein the ram is in the extending position when the rail is in the stored position.

10. A safety rail assembly as recited in claim 8, wherein the ram is located adjacent a pivot axis of the rail.

11. A safety rail assembly as recited in claim 8, in which restricted exhaust valve s are provided for the ram means for preventing the rail from lowering dangerously quickly.

12. A safety rail assembly as recited in claim 1, wherein the assembly includes operating means located remote from the rail for operating the actuating means.

13. A safety rail assembly for a vehicle catwalk having a longitudinal axis, the assembly comprising:
    a rail pivotally mounted about a pivot axis which extends substantially parallel to the longitudinal axis of the vehicle catwalk;
    fluid operated actuating means for moving the rail from a stored position to a raised operative position; the rail in the stored position overlying at least a portion of the catwalk; and
    the rail having a catwalk access blocking portion which, in the stored position, projects beyond the catwalk adjacent to an access way to the catwalk for preventing access to the catwalk unless the rail is in the raised position.

14. A safety rail assembly as recited in claim 13, wherein the assembly includes a locking means for securing the rail in one of the stored and operative positions.

15. A safety rail assembly as recited in claim 13, wherein the rail includes an access opening blocking portion which lies across access openings to a body of the vehicle when the rail is in the stored position preventing use of the access openings unless the rail is in the raised operative position.

16. A safety rail assembly as recited in claim 13, in which the actuating means comprises a ram means, operated from a fluid pressure system of a vehicle.

17. A safety rail assembly as recited in claim 16, wherein the ram means comprises at least one ram extending between the rail and the vehicle.

18. A safety rail assembly as recited in claim 17, wherein the ram is in the extended position when the rail is in the stored position.

19. A safety rail assembly as recited in claim 17, wherein the ram is located adjacent a pivot axis of the rail.

20. A safety rail assembly as recited in claim 17, in which restricted exhaust valves are provided for the ram means to prevent the rail from lowering dangerously quickly.

21. A safety rail assembly as recited in claim 13, wherein the assembly includes operating means located remote from the rail for operating the actuating means.

* * * * *